Aug. 9, 1966  E. N. YOUNT ET AL  3,265,350
CONTROLLER
Original Filed Nov. 4, 1960  2 Sheets-Sheet 1
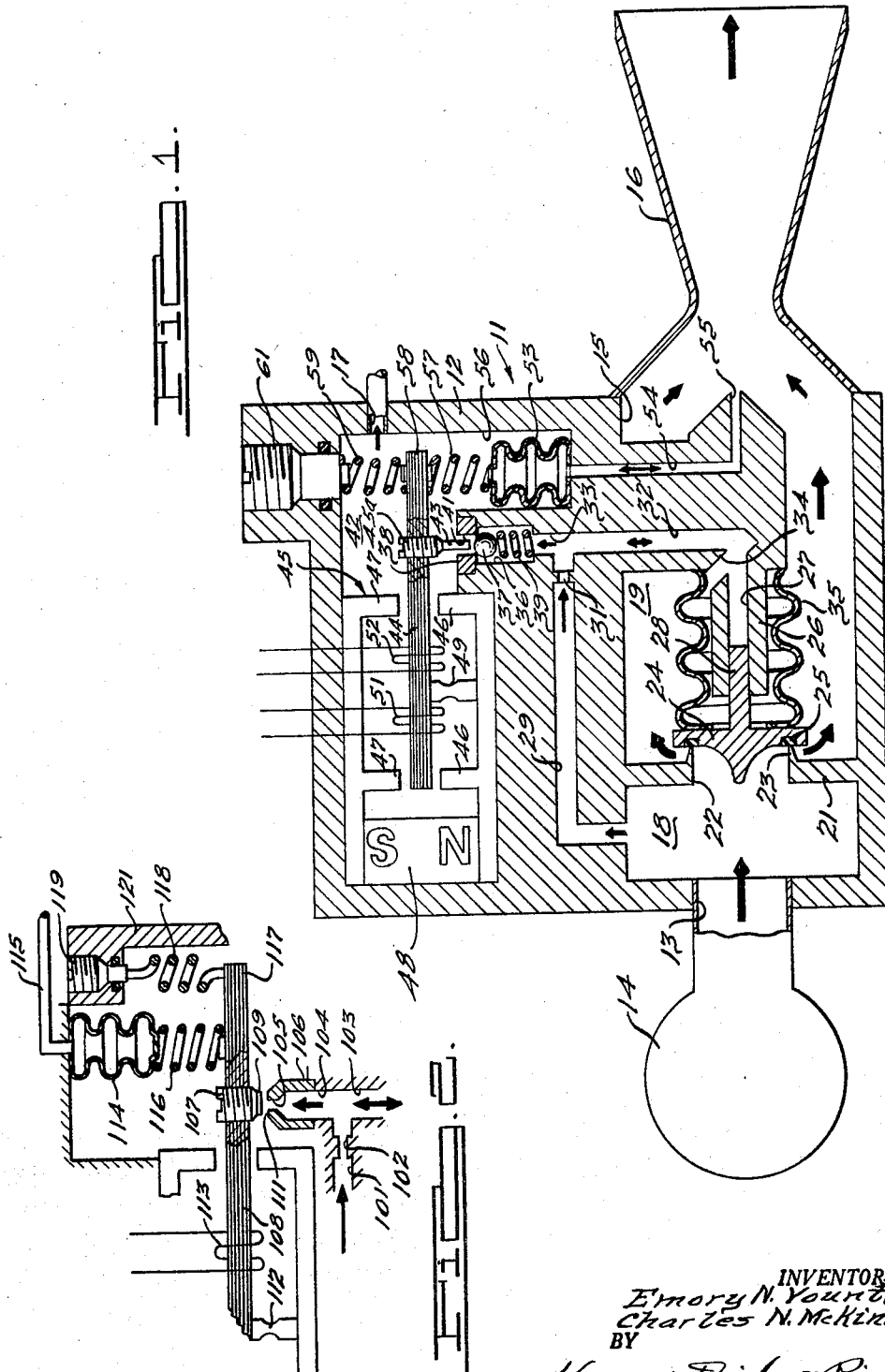
INVENTORS
Emory N. Yount,
Charles N. McKinnon, Jr.
BY
Harness, Dickey & Pierce
ATTORNEYS.

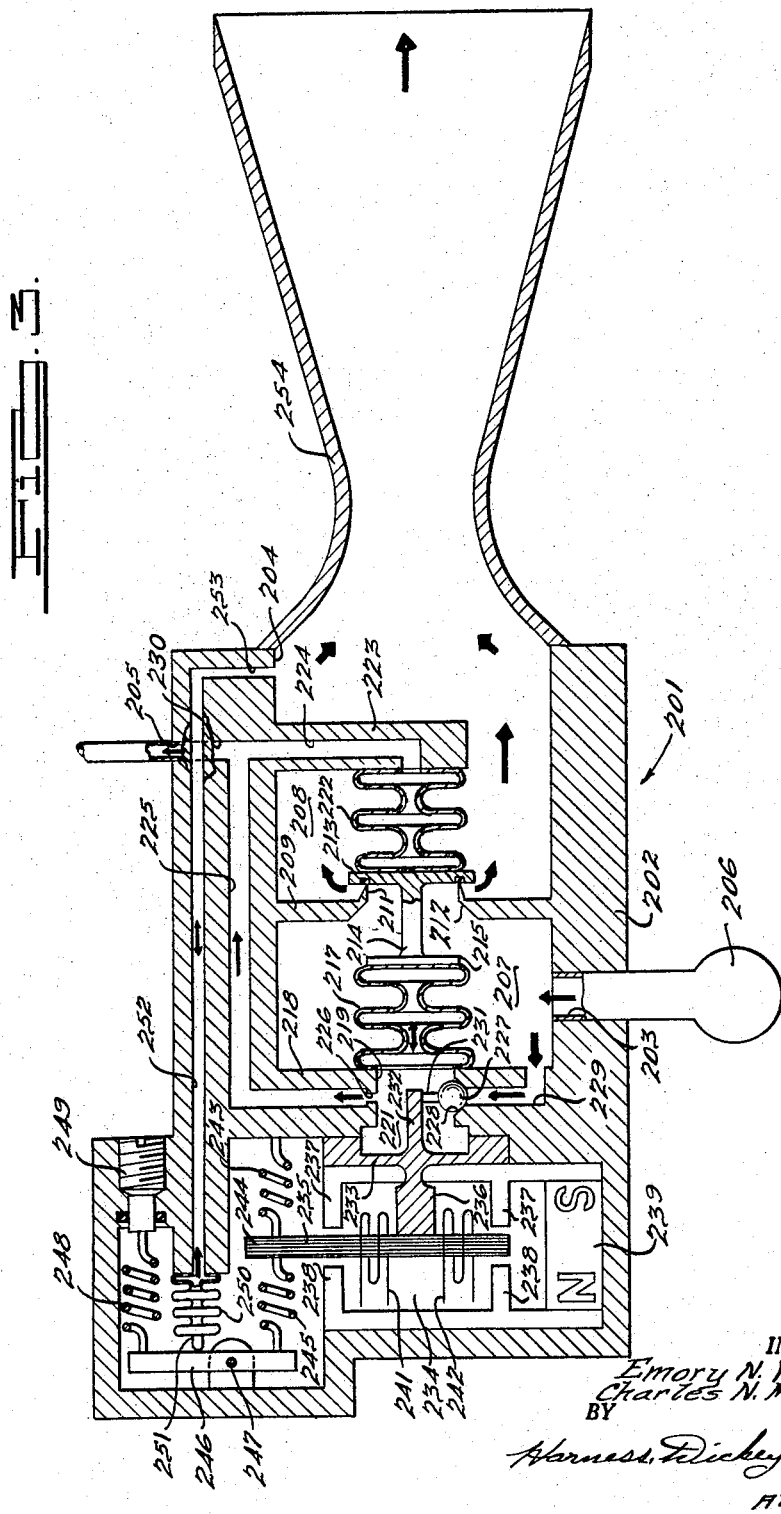

United States Patent Office 3,265,350
Patented August 9, 1966

3,265,350
CONTROLLER
Emory N. Yount, Fullerton, and Charles N. McKinnon, Jr., Costa Mesa, Calif., assignors to Cadillac Gage Company, Warren, Mich., a corporation of Michigan
Continuation of application Ser. No. 67,192, Nov. 4, 1960. This application Oct. 11, 1963, Ser. No. 315,635
2 Claims. (Cl. 251—30)

This application is a continuation of application Ser. No. 67,192, filed Nov. 4, 1960 and now abandoned.

This invention relates to controllers, and more particularly to electropneumatic thrust controllers for varying the output of a thrust producing unit in accordance with a command signal.

Thrust producing units such as are used in the attitude control sub-systems of satellite vehicles must be capable of reacting to extremely weak command signals and be responsive to slight signal variations. They must also be capable of automatic regulation of the thrust at any given signal setting in response to unpredictable variations in supply pressure as well as thrust output.

It is an object of the present invention to provide a novel and improved controller which meets these requirements, permitting continuous modulation of thrust proportional to an electrical input command signal, and which will also perform an automatic thrust regulating function at any given signal value in response to variations of either the gas supply pressure or the static pressure at the thrust nozzle.

It is another object to provide an improved controller of this nature having a high speed of response even with a low pressure gas supply, and which is capable of operation with various types of gases, such as air, hydrogen or helium, as well as with substances such as refrigerants and products of combustion.

Other objects, features, and advantages of the present invention will become apparent from the subsequent description, taken in conjunction with the accompanying drawings.

In the drawings:

FIGURE 1 is a schematic cross-sectional view in elevation of one embodiment of the controller;

FIGURE 2 is a fragmentary schematic cross-sectional view in elevation of a modified form of pilot valve; and FIGURE 3 is a schematic cross-sectional view in elevation of another and preferred embodiment of the controller, in which means are provided for preventing thrust variations due to sudden changes in gas supply pressure.

In general terms, the invention comprises a main valve interposed between a gas supply source and a thrust producing element such as a nozzle, the main valve being of a poppet type and being exposed to gas supply pressure on one side. A pilot valve is also provided, together with a connection between the gas supply port and one side of this pilot valve, the other side being connected to exhaust. This arrangement, in conjunction with a fixed orifice and a conduit leading to a bellows on the other side of the main valve, will result in opening of the main valve in direct proportion to opening of the pilot valve. The pilot valve is spring-urged towards its closed position, and a torque motor engages the pilot valve to urge it into open position, this motor counteracting the spring force in direct proportion to the magnitude of its differential coil current. Another bellows is connected to the torque motor and aids the pilot valve spring force (counteracting the motor force) in direct proportion to the static pressure at the thrust nozzle. The thrust may thus be varied in direct proportion to input signal current, and at any signal setting, the thrust will be regulated by maintaining it constant despite variations in supply pressure or static thrust pressure.

Referring more particularly to the drawings, and to the embodiment shown in FIGURE 1, the unit is generally indicated at 11 and comprises a housing 12 having a supply port 13 connectable to a gas supply source 14. Housing 12 also has an outlet or working port 15 connectable to a thrust nozzle 16 or other thrust producing element. A convergent-divergent nozzle, such as is shown in FIGURE 1, would be used at high altitudes, whereas a convergent nozzle would normally be used at sea level pressures. Housing 12 is further provided with an exhaust port 17.

Supply port 13 leads to an inlet chamber 18, this chamber being separated from an outlet chamber 19 by a wall 21. An apertured portion 22 is provided in wall 21, this aperture having a valve seat 23 engageable by a main valve 24. This valve is of a poppet type, having an annular seat 25 engageable with seat 23, this seat extending toward chamber 19. Valve 24 is supported for sliding movement by a housing extension 26 having a channel 27 receiving valve stem 28.

A passageway 29 having a fixed orifice 31 leads from inlet chamber 18, and two branch passages 32 and 33 lead from the exit side of orifice 31. Passage 32 leads to channel 27, and also by means of a branch passage 34 to the interior of a bellows 35, this bellows surrounding housing extension 27 and being secured at one end of the housing and at the other end to valve 24. The relative areas of poppet valve 24 and bellows 35 are such that the poppet valve will remain closed when the pressure in chamber 18 is equal to the pressure in bellows 35, but will open an amount directly proportional to the difference between these two pressures.

Branch conduit 33 leads to a pilot valve chamber 36 within which is disposed a pilot valve 37. This valve is of a spherical type and is urged against the underside of a valve seat 38 by a compression spring 39 disposed within chamber 36. A passageway 41 is formed within valve seat 38, so that gas will pass the pilot valve when it is forced downwardly away from the valve seat. Passageway 41 leads to a vent chamber 42 connected to exhaust port 17.

The means for controlling the position of pilot valve 37 comprises a pilot valve operating pin 43 mounted on the armature 44 of a torque motor generally indicated at 45 by an adjusting screw 45a. Armature 44 is of elongated shape and is disposed between the north poles 46 and the south poles 47 of a torque motor magnet 48. Armature 44 is supported by an armature spring hinge 49 which normally urges it in a counterclockwise direction as seen in FIGURE 1, thus permitting closure of pilot valve 37 by spring 39. A pair of torque motor coils 51 and 52 surround armature 44 on opposite sides of hinge 49, these coils producing flux in response to an input command signal tending to cause clockwise rotation of armature 44, that is, rotation counteracting the force of spring hinge 49 and tending to urge pin 43 downwardly against pilot valve 37, opening the valve.

Means are provided for counteracting the force of coils 51 and 52 in direct proportion to the static pressure at thrust nozzle 16. This means includes bellows 53, the interior of which is connected by a passage 54 to a sensing port 55 within thrust nozzle 16. Bellows 53 is disposed within a space 56 in housing 12 alongside chamber 36, and the movable end of the bellows is connected by a coil compression spring 57 to one end 58 of armature 44, so that expansion of the bellows will tend to rotate the armature counterclockwise. A counterbalancing and adjusting spring 59 is provided on the opposite side of armature end 58, this spring being engageable at one end with an adjusting screw 61 mounted in housing 12.

In operation, assuming an initial condition in which gas under pressure is supplied to port 13 but no current is flowing in coils 51 or 52, pilot valve 37 will be in its closed position. Since no gas is flowing through orifice 31, the pilot control pressure in conduits 32 and 33, as well as within bellows 35, will be equal to the supply pressure in inlet chamber 18. Under these conditions, main valve 24 will be held in its closed position. The construction of valve seat 23, as well as that of member 25 are such when main valve 24 is closed no supply gas will leak into chamber 19.

Pilot valve 37 will be held in engagement with seat 38 by spring 39, and pin 43 will be urged away from engagement with pilot valve 37 by spring hinge 49 and spring 57. Adjusting spring 59 may be set by screw 61 so that, at the attainment of a predetermined differential current in coils 51 and 52, armature 44 will be urged clockwise with sufficient force to overcome springs 49 and 57, as well as spring 39, and begin to lift pilot valve 37 off its seat.

When this occurs, gas will flow through passageway 41 to vent chamber 42, and the subsequent flow through restriction 31 will cause a drop in pressure in passageways 32 and 33 as well as within bellows 35. The pressure exerted by the gas in chamber 18 on main valve 24 will thus cause opening of this valve, the amount of opening being linearly proportional to the change in pilot control pressure within bellows 35. Gas will thus flow into outlet chamber 19 and to thrust nozzle 16, creating a thrust at a magnitude linearly proportional to the command signal.

Should a variation occur in the pressure of the supply gas, this variation will be transmitted to both sides of main valve 24, so that the setting of the main valve will not be affected. Should the pressure at sensing port 55 increase for some reason above the normal pressure for the particular main valve setting, this pressure increase will be transmitted to bellows 53 and spring 57. The latter will urge armature 44 counterclockwise with an additional force, and pilot valve 37 will thus be permitted to move toward valve seat 38. This will cause an increase in the pilot control pressure within bellows 35, and main valve 24 will move proportionally toward its closed position, thus tending to decrease the pressure at sensing port 55. This regulating action due to the feedback from nozzle 16 to pilot valve 37 will be effective for any signal current setting, the apparatus thus having the action of a closed loop servomechanism.

In addition to the aforementioned advantages of unit 11, it has been found that the unit may be constructed so as to be sensitive to extremely small command signals, producing measurable thrusts at very low percentages of the maximum signal. The unit can produce maximum thrust with the dissipation of a relatively small amount of electrical power and exhibit high speed of response even with low gas supply pressures.

FIGURE 2 illustrates a modified form of the pilot mechanism. In this instance, a passageway 101 is indicated as leading from the inlet chamber (not shown) through a fixed restriction or orifice 102 to branch passages 103 and 104, passage 103 leading to the main valve bellows (also not shown). Passageway 104 leads to a passage 105 within a valve seat 106. A pilot valve 107 in the form of a pin threaded into an armature 108 is disposed above seat 106, this valve having a flat portion 109 engageable with the flat top surface 111 of seat 106.

Armature 108 is supported by a spring hinge 112 urging the armature clockwise so that valve 107 will engage seat 106. Signal coils, one of which is shown at 113, produce flux in response to signal current tending to counteract the force of spring 112 and open the pilot valve. A feedback bellows 114 is connected by a conduit 115 to a sensing port (not shown) so that the pressure in bellows 114 will be equal to the static pressure at the thrust nozzle. The movable end of bellows 114 is connected by a spring 116 to the top of one end 117 of armature 108, so that an increase in pressure in bellows 114 will tend to counteract the force created by current within coil 113. An adjusting tension coil spring 118 is secured at one end to end 117 of armature 108 and at its other end to an adjusting screw 119 mounted in housing 121. This pilot mechanism will operate in a manner similar to the ball pilot valve 37 of the previous embodiment.

FIGURE 3 shows a preferred embodiment of the invention, generally indicated at 201, which includes a housing 202 having a supply port 203, a working port 204 and an exhaust port 205. Port 203 leads from a gas supply source 206 to an inlet chamber 207 within housing 202, this chamber being separated from an outlet chamber 208 connected to port 204 by a wall 209. A valve seat 211 in an aperture 212 of wall 209 faces chamber 208, and a main poppet valve 213 on a spool 214 is engageable with this seat. One end 215 of spool 214 within chamber 207 is secured to one end of a bellows 217, the other end of this bellows being secured to a wall 218 within housing 202 around an aperture 219. Aperture 219 leads to a pilot control pressure chamber 221 so that this chamber communicates with the interior of bellows 217, the pressure in this chamber tending to lift valve 213 off seat 211.

The other end of spool 214 within chamber 208 has one end of a bellows 222 secured thereto, the other end of this bellows being secured to a wall 223 of housing 202 carrying a passageway 224 connected with the interior of bellows 222. This passageway is connected by a passageway 225 to chamber 221, a restriction or fixed orifice 226 being disposed between chamber 221 and passageway 225. Another branch passageway 230 leading from the juncture of passageways 224 and 225 leads to exhaust port 205.

The relative effective areas of valve seat 211 and bellows 217 are such that when no pressure exists within chamber 221, that is, when this chamber as well as the space within bellows 217 and 222 are at vent pressure, valve 213 will be held closed. When the pressure in chamber 221 rises above the vent pressure level, the flow of gas through restriction 226 will cause a pressure differential between the interiors of bellows 217 and 222 urging main valve 213 open an amount linearly proportional to the rise in pressure in chamber 221.

The pressure in this chamber is controlled by a ball type of pilot valve 227 engageable with a frusto-conical valve seat 228 formed in housing 202. Valve seat 228 is connected by a conduit 229 with inlet chamber 207. Valve 227 is normally urged against seat 228 by a pin 231, this pin being carried by an arm 232 attached to a spring diaphragm 233. The outer portions of the spring diaphragm are secured to the interior of housing 202, and the diaphragm serves to separate chamber 221 from a torque motor compartment 234 within housing 202. An armature 235 is disposed within this compartment 234, an intermediate portion of the armature being secured to diaphragm 233 by an arm 236. Two pairs of permanent magnet poles 237 and 238 connected to a magnet 239 within housing 202 are disposed on opposite sides of armature 235. A pair of coils 241 and 242 also surround armature 235 and are connectable to a source of input signal command current.

A tension coil spring 243 is disposed adjacent one end 244 of armature 235, one end of this spring being connected to end 244 and the other to housing 202 so that spring 243 urges armature 235 clockwise, that is, in a direction so that pin 231 will be urged against pilot valve 227 to close the valve. Another tension coil spring 245 is connected to the other side of armature end 244, the other end of spring 245 being connected to one end of an arm 246 on a fixed pivot 247 within housing 202. A tension coil adjusting spring 248 is secured to the side of arm 246 opposite the connection to spring 245, the other end of spring 248 being connected to an adjusting screw 249 mounted in housing 202. A regulating bellows 250 is mounted within housing 202 and has a movable end 251 engageable with arm 246 on the same side of pivot 247 as spring 248. The interior of bellows 250 is connected by a passageway 252 to a static pressure sensing port 253 adjacent a thrust nozzle 254 connected to port 204. Pressure within bellows 250 will tend to rock arm 246 counterclockwise against the action of spring 248, thus permitting spring 243 to counteract the force created by current in coils 241 and 242, and tending to close pilot valve 227.

In operation of the embodiment of FIGURE 3, assuming an initial condition in which no differential current flows to coils 241 and 242, pilot valve 227 will be held closed by spring 243 urging armature 235 clockwise, which will rotate arms 232 and 236 clockwise about the center of diaphragm 233 to force pin 231 against pilot valve 227. The tension of spring 248 may be adjusted to preselect the current in coils 241 and 242 which will be sufficient to counteract spring 243 and lift pin 231 away from valve 227.

When the valve is closed, vent pressure will exist in diaphragms 217 and 222, the pressure within inlet chamber 207 thus holding main valve 213 closed. As armature 235 is urged counterclockwise by current in coils 241 and 242, valve 227 will be permitted to lift under the supply pressure in passageway 229. Gas will flow through chamber 221 and restriction 226 to vent port 205, thus creating a pressure differential between the interiors of bellows 217 and 222. This pressure differential will cause main valve 213 to be lifted from valve seat 211. As in the previous embodiment, the degree of movement of main valve 213 will be linearly proportional to the opening movement of pilot valve 227, the latter movement in turn being linearly proportional to the magnitude of the differential signal current.

Should a variation in supply pressure occur at any given setting of valve 213, this variation will instantaneously act on both the exterior of bellows 217 and on the face of main valve 213 which is directed toward inlet chamber 207. This variation of supply pressure results in no unbalancing force being exerted on main valve spool 214, if areas and bellows characteristics are properly chosen. In this respect, the embodiment of FIGURE 3 will be superior in its action to that of FIGURE 1, since in the latter embodiment a slight time lag might occur in the case of a sudden variation in the pressure of inlet chamber 18 before this variation occurred within bellows 35. The embodiment of FIGURE 3 ensures against any unwarranted imbalance of forces on main valve spool 214 no matter how sudden the supply pressure variation may be.

Should a static pressure variation occur in thrust nozzle 254 at any setting of main valve 213, this variation will be transmitted to bellows 250. For example, should the static pressure increase, expansion of bellows 250 will urge arm 246 counterclockwise, counteracting the force of spring 248 and coils 241 and 242, and permitting spring 243 to move armature 235 in a direction tending to close pilot valve 227. This will decrease the flow of gas into chamber 221 and through restriction 26, lessening the pressure differential between the interiors of bellows 217 and 222, and causing movement of main valve 213 towards its closed position. It has been found that the use of pivoted arm 246, permitting separation of armature 235 from direct contact with bellows 250 and spring 248, permits a wider selection of bellows and spring rates, thus increasing the versatility of the unit. Another advantage of the embodiment of FIGURE 3 is that the torque motor is isolated from the gas supply by diaphragm 233 and thus will be less susceptible to contamination.

While it will be apparent that the preferred embodiments of the invention disclosed are well calculated to fulfill the objects above stated, it will be appreciated that the invention is susceptible to modification, variation and change without departing from the proper scope on fair meaning of the subjoined claims.

What is claimed is:

1. In a controller, a supply port, a working port and an exhaust port, a first connection between said supply and exhaust ports, a second connection between said supply and working ports, a pilot valve in said first connection, means for controlling the position of said pilot valve, a restriction between said pilot valve and exhaust port, a poppet-type main valve in said second connection comprising a spool, a first bellows connected to one end of said spool, the interior of said first bellows being connected to said first connection between said pilot valve and restriction, a second bellows connected to the other end of said spool, the interior of said second bellows being connected to the exit side of said restriction, and an inlet chamber in communication with said supply port, said first bellows and main valve spool being disposed in said inlet chamber, the relative areas of said first bellows and spool being such that pressure in the inlet chamber will tend to maintain the main valve in its closed position.

2. In a controller, a supply port, a working port and an exhaust port, a first connection between said supply and exhaust ports, a second connection between said supply and working ports, a pilot valve in said first connection, means for controlling the position of said pilot valve, a restriction between said pilot valve and exhaust port, a poppet-type main valve in said second connection comprising a spool, a first bellows connected to one end of said spool, the interior of said first bellows being connected to said first connection between said pilot valve and restriction, a second bellows connected to the other end of said spool, the interior of said second bellows being connected to the exit side of said restriction, said means for controlling the pilot valve position comprising a torque motor having an armature disposed between magnetic poles, a housing for said torque motor, said valves and said connections, a diaphragm within said housing, one side of said diaphragm being exposed to said first connection between said pilot valve and restriction, the other side of said diaphragm facing the portion of said housing enclosing said torque motor, a first arm secured to said diaphragm and carrying means engageable with said pilot valve in a direction tending to close the pilot valve, and a second arm secured to the opposite side of said diaphragm and supporting said armature.

References Cited by the Examiner
UNITED STATES PATENTS

| | | | |
|---|---|---|---|
| 859,152 | 7/1907 | Tippet | 251—33 |
| 2,790,427 | 4/1957 | Carson | 137—85 X |
| 2,912,997 | 11/1959 | Griswold | 137—456 |
| 2,927,593 | 3/1960 | Hall et al. | 137—85 |
| 3,080,878 | 3/1963 | Dustin et al. | 137—85 |
| 3,105,671 | 10/1963 | Teitelbaum et al. | 251—30 |
| 3,121,440 | 2/1964 | Heller | 137—85 |

M. CARY NELSON, *Primary Examiner.*

A. ROSENTHAL, *Assistant Examiner.*